J. R. DAVIDSON.
COTTON CHOPPER.
APPLICATION FILED AUG. 24, 1918.

1,314,307.

Patented Aug. 26, 1919.
2 SHEETS—SHEET 1.

Witness
Chas. L. Grieshaber

Inventor
John R. Davidson
By Foster Freeman Watson Hort
Attorneys

J. R. DAVIDSON.
COTTON CHOPPER.
APPLICATION FILED AUG. 24, 1918.
1,314,307.
Patented Aug. 26, 1919.
2 SHEETS—SHEET 2.
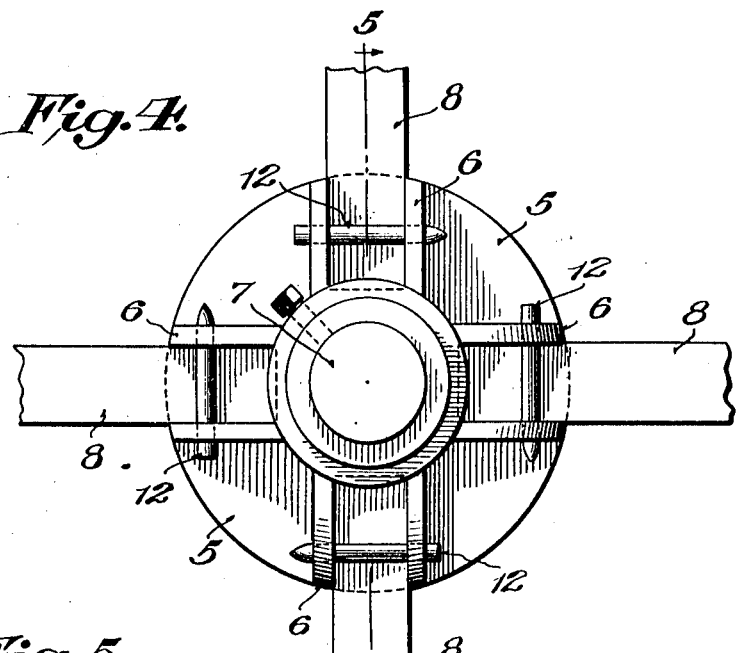
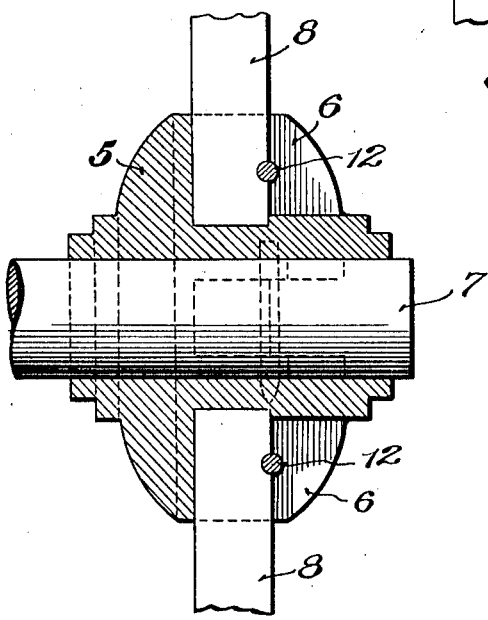

UNITED STATES PATENT OFFICE.

JOHN R. DAVIDSON, OF MONTICELLO, GEORGIA, ASSIGNOR OF ONE-HALF TO B. E. McELHENEY, OF MONTICELLO, GEORGIA.

COTTON-CHOPPER.

1,314,307.  Specification of Letters Patent.  Patented Aug. 26, 1919.

Application filed August 24, 1918. Serial No. 251,304.

*To all whom it may concern:*

Be it known that I, JOHN R. DAVIDSON, a citizen of the United States, and resident of Monticello, Georgia, have invented certain new and useful Improvements in Cotton-Choppers, of which the following is a specification.

My invention relates to improvements in cotton chopping machines, and consists in certain devices which preferably are adapted for attachment to the beam of an ordinary plow, whereby the chopping may be effected, as fully set forth hereinafter and as illustrated in the accompanying drawing, in which:

Figs. 4 and 5 are detail views, on an enlarged scale of the connections between the hub and radial arms of the chopper.

Figure 1:
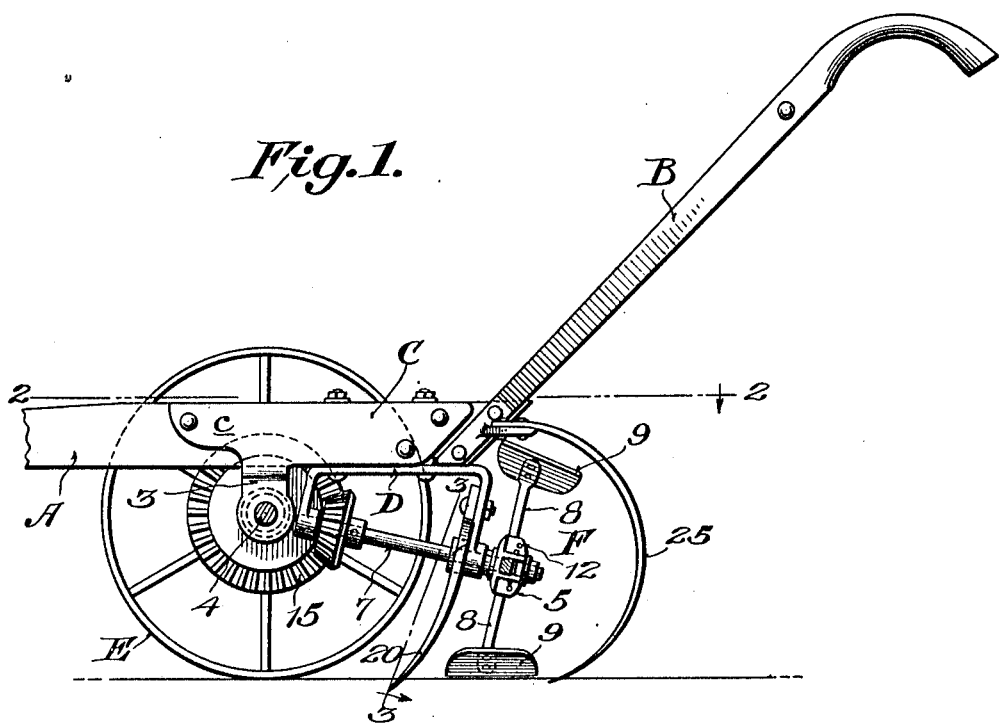
Figure 1 is a side elevation of a cotton chopper embodying my improvement, one of the wheels being removed.
Figure 2:
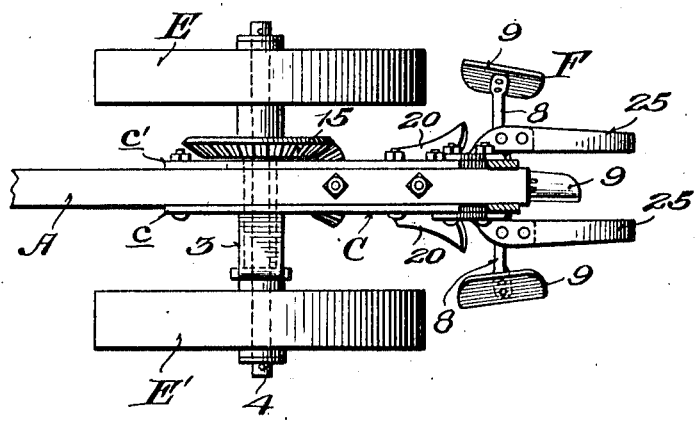
Fig. 2 is a plan, the handles being shown in section, on the line 2—2 of Fig. 1.
Figure 3:
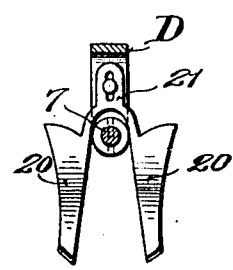
Fig. 3 is a section on the line 3—3 of Fig. 1.

As shown in the drawing the parts are adapted for application to the beam A of an ordinary plow which is provided with handles B and from which the share has been removed, permitting the application of a bearing support or supports, the same being shown in the form of brackets C, C', D, although a single bracket with suitable bearings may be used. As shown the brackets C, C' have ears *c* with openings which will coincide with the openings receiving the bolts for securing the ordinary attachments of a plow, and the bracket D has also openings which will coincide with those ordinarily found in plow beams when the adjuncts thereof are removed, and these brackets are applied and suitably secured by bolts as shown.

The brackets C, C' D have depending ears 3 receiving a transverse shaft 4 which supports the carrier wheels E, E' the former preferably being secured to the shaft while the other E' turns freely thereon which enables the apparatus to be turned vertically about either wheel as a pivot, so that it can be carried into the corners of a field and closer to hedges than would otherwise be possible. The comparatively large bevel gear 15 is secured to the shaft 4 and thus turns with wheel E.

The bearings provided by the bracket D receive a longitudinal shaft 7 to the rear end of which is secured the chopper F, the latter having a hub 5 and radial arms 8, to which are secured the chopping blades or cutters 9. In order to prevent the breaking of the arms each arm is connected with the hub 5 by a wooden pin 12, which extends through the sides 6 of sockets or seats formed in the hub and through a groove or notch in an edge of the arm 8 and which will break in case the arm or the blade strikes any obstruction tending to deflect the same.

The shaft 7 is driven from the shaft 4 in any suitable manner, but, as shown, there is a gear wheel 15 connected with one of the carrier wheels E, and geared with a bevel pinion upon the forward end of the shaft 7.

As the apparatus is drawn forward the rotation of the wheels E imparts rotation to the shaft 7 through the gear 15 and the small meshing beveled gear on the end of shaft 7, and the cutter operates in the well known manner to effect the desired operations.

Inasmuch however as the cutter wheel F is at the rear of the apparatus, it is directly under the eye of the operator, who can not only thus keep constant watch of its operations, but also can observe the ground in front of the wheels so that in case there is a stone or other obstruction he can swing the apparatus short upon either wheel as a pivot so as to avoid striking the said obstruction; or, if it is not too great in height he can, by lifting the arms B, raise the wheel so that it will pass over the obstruction, and these operations may be performed without arresting the forward movement of the apparatus or slowing up. It will be seen that the capacity to turn short and to thus raise the chopper is secured without the necessity of any effort upon the part of the operator to maintain the balance of the apparatus or exert any material effort to support the same, as would be necessary where the apparatus is provided with but a single wheel. It will be further seen that the parts are so arranged that the weight is to a great extent balanced, which further avoids the necessity of exerting any power by the operator, and, that as the brackets are adapted for adjustment to ordinary plow beams, it is not necessary for the farmer to purchase a special apparatus, but simply to purchase the attachment and apply it to the beam of his plow.

A pair of cultivator teeth 20 are arranged slightly in front of the chopper F and so positioned as to straddle the row in which the chopper works.

As shown such teeth are supported by a head 21 which is suitably bolted to the rear bearing section of the bracket D. The shaft 7 extends through the space between said teeth 20.

Spring covering teeth 25 are provided in rear of the chopper, the function thereof being to slightly hill up the loosened earth about the plants left standing by the chopper. Said teeth are attached to angle plates secured to the beam A by the same bolts that are used to fasten the handles B thereto.

I claim as my invention:

1. The combination of a single ordinary plow beam with a rotary supporting shaft extending transversely of said beam and provided with wheels and with a driving gear between said wheels, detachable means connecting said shaft to said beam, a longitudinally extending rotary shaft beneath said beam to the rear of said transverse shaft provided with a gear on its forward end engaging the gear on said transverse shaft and a chopper wheel on its rear end and detachable means provided with bearings for said longitudinal shaft secured to said beam and cultivator teeth adjustably secured to said detachable means in advance of said chopper wheel.

2. The combination of a single ordinary plow beam with a rotary supporting shaft extending transversely of said beam and provided with wheels and with a driving gear between said wheels, detachable means connecting said shaft to said means, a longitudinally extending rotary shaft between said beam to the rear of said transverse shaft provided with a gear on its forward end engaging the gear on said transverse shaft and a chopper wheel on its rear end and detachable means provided with bearings for said longitudinal shaft secured to said beam and cultivator teeth adjustably secured to said detachable means in advance of said chopper wheel, ordinary guiding and controlling handles secured to said beam at its rear end and spring covering teeth secured to said handles where they join the beam and extending to a point in the rear of said chopper wheel.

3. The combination of a single ordinary plow beam, of depending brackets detachably secured to said beam near its rear end and having transverse alined bearings below said beam, a rotatable shaft mounted in said bearings having a wheel at one end rigidly secured thereto and a wheel at the other end rotatively mounted thereon, a gear wheel secured on said shaft, a longitudinally extending detachable bracket secured to the under face of the beam at its rear end and having depending portions at its front and rear ends provided with longitudinally alined bearings, a shaft mounted in said bearings having a gear at its forward end meshing with the first mentioned gear and a chopper wheel at its rear end.

4. The combination of a single ordinary plow beam, of depending brackets detachably secured to said beam near its rear end and having transverse alined bearings below said beam, a rotatable shaft mounted in said bearings having a wheel at one end rigidly secured thereto and a wheel at the other end rotatively mounted thereon, a gear wheel secured on said shaft, a longitudinally extending detachable bracket secured to the under face of the beam at its rear end and having depending portions at its front and rear ends provided with longitudinally alined bearings, a shaft mounted in said bearings having a gear at its forward end meshing with the first mentioned gear and a chopper wheel at its rear end, cultivator teeth in advance of said chopper wheel adjustably secured to the rear depending portion of said longitudinally extending bracket.

5. A cotton chopping attachment for ordinary plow beams comprising a rotary shaft having wheels on its ends and an intermediate gear wheel, brackets having bearings fitting said shaft and adapted to be detachably secured to a plow beam, a longitudinally extended bracket or member having depending portions at its ends provided with alined longitudinal bearings, a rotary shaft mounted in said bearings and having a gear at its forward end adapted to engage said first mentioned gear and a chopper wheel at its rear end and means for detachably securing said longitudinal bracket to the plow beam.

In testimony whereof I affix my signature in presence of two witnesses.

JOHN R. DAVIDSON.

Witnesses:
JOHN S. WILLIAMS,
A. M. SPEARS.